(12) United States Patent
Linke et al.

(10) Patent No.: US 11,845,214 B2
(45) Date of Patent: Dec. 19, 2023

(54) METHOD AND DEVICE FOR PRODUCING FILLED CONTAINERS FROM PREFORMS

(71) Applicant: KHS GmbH, Dortmund (DE)

(72) Inventors: Michael Linke, Hamburg (DE); Michael Litzenberg, Börnsen (DE); Niels Meyer, Schenefeld (DE)

(73) Assignee: KHS GmbH, Dortmund (DE)

( * ) Notice: Subject to any disclaimer, the term of this patent is extended or adjusted under 35 U.S.C. 154(b) by 116 days.

(21) Appl. No.: 17/435,094

(22) PCT Filed: Jun. 10, 2020

(86) PCT No.: PCT/EP2020/066144
§ 371 (c)(1),
(2) Date: Aug. 31, 2021

(87) PCT Pub. No.: WO2020/254174
PCT Pub. Date: Dec. 24, 2020

(65) Prior Publication Data
US 2022/0126500 A1 Apr. 28, 2022

(30) Foreign Application Priority Data
Jun. 19, 2019 (DE) .................. 10 2019 116 598

(51) Int. Cl.
*B29C 49/46* (2006.01)
*B29C 49/36* (2006.01)
(Continued)

(52) U.S. Cl.
CPC .............. *B29C 49/46* (2013.01); *B29C 49/36* (2013.01); *B29C 49/4205* (2013.01);
(Continued)

(58) Field of Classification Search
CPC . B29C 49/46; B29C 2049/4664; B29C 49/36; B29C 49/70; B29C 2049/709;
(Continued)

(56) References Cited

U.S. PATENT DOCUMENTS 7,357,893 B2 4/2008 Hansen et al.
9,896,318 B2 2/2018 Hirdina
(Continued)

FOREIGN PATENT DOCUMENTS

CN 1481317 A 3/2004
CN 101863309 A 10/2010
(Continued)

OTHER PUBLICATIONS

International Search Report dated Sep. 14, 2020 filed in PCT/EP2020/066144.

*Primary Examiner* — Robert B Davis
(74) *Attorney, Agent, or Firm* — Rankin, Hill & Clark LLP

(57) ABSTRACT

A method for producing filled containers (16) from preforms (13). Each of the preforms is transferred to a circulating molding and filling element (14) of a molding and filling station and is shaped into the respective container in a subsequent molding and filling process in a mold under the effect of pressure from a supplied filler, wherein the mold is designed in multiple parts, including a base mold (21) and mold sides (19, 20), and each container is clamped between the base mold at the bottom and the molding and filling element at the top at least at the end of the molding and filling process. The container is separated from the respective molding and filling element and the respective mold after the molding and filling process. The mold sides are removed from each container before the molding and filling element and the base mold are separated from the container.

13 Claims, 4 Drawing Sheets

Figure 1:
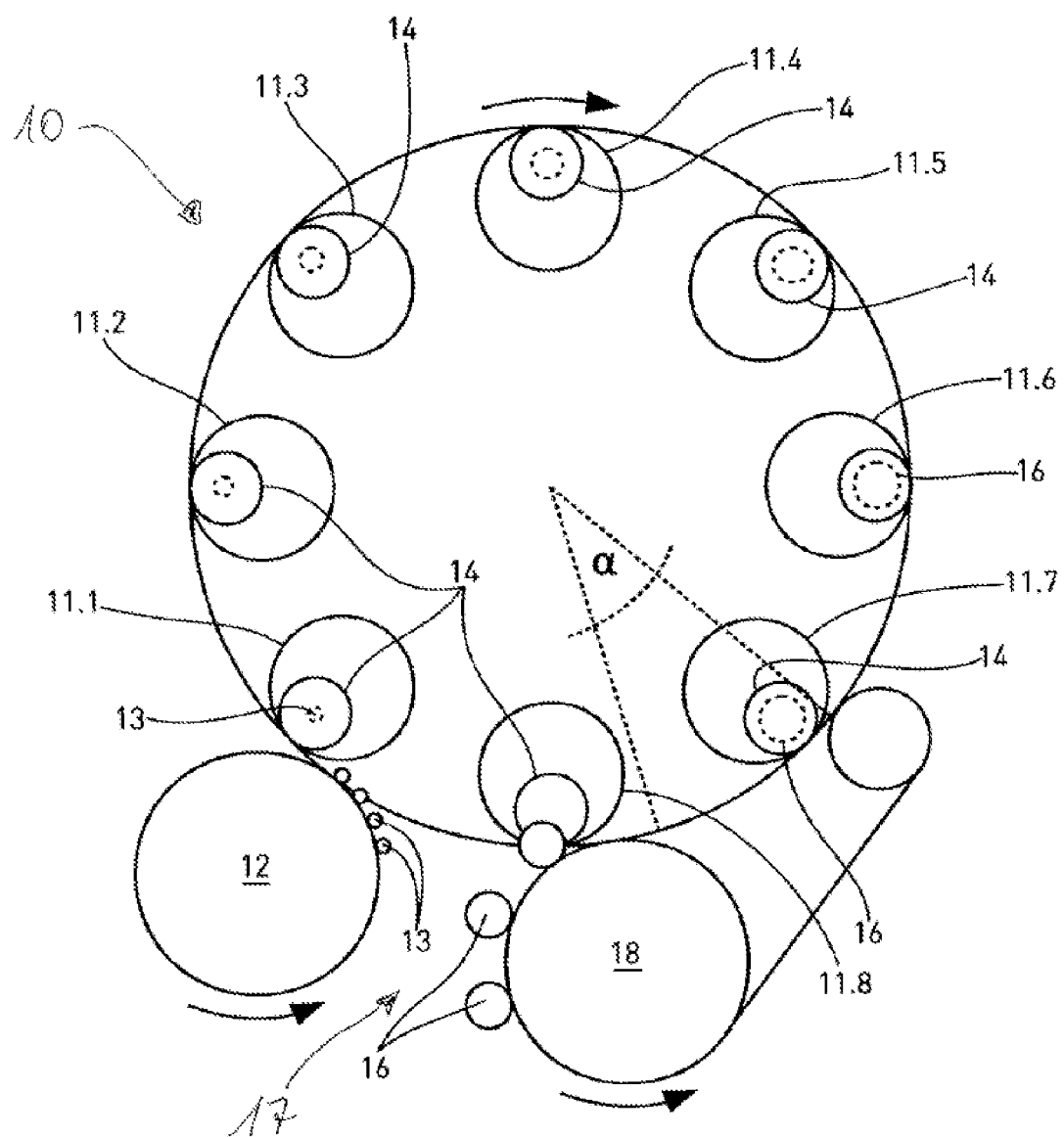

(51) Int. Cl.
  *B29C 49/42* (2006.01)
  *B29C 49/70* (2006.01)
  *B65B 3/02* (2006.01)
  *B65B 3/10* (2006.01)
  *B65B 39/14* (2006.01)
  *B65B 47/08* (2006.01)
  *B67C 3/24* (2006.01)
  *B29K 701/12* (2006.01)
  *B29L 31/00* (2006.01)
  *B67C 3/22* (2006.01)

(52) U.S. Cl.
  CPC .............. *B29C 49/70* (2013.01); *B65B 3/022* (2013.01); *B65B 3/10* (2013.01); *B65B 39/145* (2013.01); *B65B 47/08* (2013.01); *B67C 3/242* (2013.01); *B29C 2049/4664* (2013.01); *B29K 2701/12* (2013.01); *B29L 2031/7158* (2013.01); *B67C 2003/227* (2013.01)

(58) Field of Classification Search
  CPC .... B29C 2049/4889; B29C 2049/4892; B29C 2049/4894
  See application file for complete search history.

(56) References Cited

U.S. PATENT DOCUMENTS

| | | | |
|---|---|---|---|
| 10,350,815 | B2 | 7/2019 | Diesnis et al. |
| 10,363,698 | B2 | 7/2019 | Diesnis |
| 10,363,699 | B2 | 7/2019 | Kharchenko et al. |
| 10,632,666 | B2 | 4/2020 | Hirota et al. |
| 2014/0174034 | A1 | 6/2014 | Drenguis et al. |
| 2014/0196415 | A1 | 7/2014 | Drenguis et al. |
| 2016/0059469 | A1 | 3/2016 | Diesnis et al. |
| 2016/0271858 | A1* | 9/2016 | Diesnis .................. B29C 49/06 |
| 2017/0021553 | A1 | 1/2017 | Kharchenko et al. |
| 2017/0173842 | A1 | 6/2017 | Hirota et al. |

FOREIGN PATENT DOCUMENTS

| | | |
|---|---|---|
| CN | 105555667 A | 5/2016 |
| CN | 106103043 A | 11/2016 |
| CN | 106573406 A | 4/2017 |
| DE | 3729166 A1 | 4/1988 |
| EP | 3178629 A1 | 6/2017 |
| GB | 2195287 A | 4/1988 |
| JP | H0957838 A | 3/1997 |
| JP | H10217321 A | 8/1998 |
| WO | 2012156013 A1 | 11/2012 |
| WO | 2012156014 A1 | 11/2012 |

* cited by examiner

METHOD AND DEVICE FOR PRODUCING FILLED CONTAINERS FROM PREFORMS

The invention relates to a method for producing filled containers from preforms, in which the preforms are each transferred to a circulating molding and filling element of a molding and filling station and are reshaped in a mold into the respective container by the action of pressure from a supplied filling material in a subsequent molding and filling process, in which the mold with mold base and mold halves is formed in several parts, and the respective container is clamped between the mold base below and the molding and filling element above, at least at the end of the molding and filling process, and in which the container is separated from the respective molding and filling element and the respective mold after the molding and filling.

To explain the background of the invention and the object, reference is made to WO 2012/156013 A1. Circulating molding and filling points on a working wheel are disclosed, which are referred to here as molding and filling stations. Each molding and filling station has a molding and filling element and a mold for receiving a preform and for molding a container.

From the same document, a so-called form fill method is also known, in which the containers, in particular bottles made of thermoplastic material, are made from thermally conditioned preforms and, at the same time, are filled with a liquid filling material from the molding and filling element, which is used as a hydraulic pressure medium to expand the preform or is supplied to mold the container with a molding and filling pressure. At the same time as the filling, the respective preform is deformed in the mold into a container.

The preform is filled with the liquid filling material through the molding and filling element, which contains at least one filling nozzle. During the filling process, the molding and filling element seals off an upwardly directed opening in the preform so that no filling material can escape in an uncontrolled manner. To remove the filled container, however, the molding and filling element must be lifted from the opening and the mold must be opened. A small amount of the filling material can reach the inner surfaces of the mold. The wetting of the inner surfaces with filling material results in the formation of defects when filling and molding a subsequent container, with corresponding quality defects. The hygienic conditions are also impaired.

The mold typically consists of several components, namely two so-called mold halves and a mold base. The mold halves usually define the side and shoulder contours of the container, while the mold base is provided for the formation of a container base usually equipped with feet.

At the end of the molding and filling process, the filled container is held in the mold and clamped between the molding and filling element and the mold base. At the same time, the container is held in the area of the container neck by a retainer on the station side. As shown above, removing the molding and filling element from the container directly after opening the mold from the container can lead to the filling material from the area of the molding and filling element reaching the inner surfaces of the mold halves and the mold base. WO 2012/156013 A1 therefore proposes cleaning an interior of the mold.

It is furthermore known in the prior art that a preform is initially provided with an adapter element or an extension element which subsequently goes through the further machining stations together with the preform. Thus, for example, U.S. Pat. No. 10,350,815 B2 discloses an extension element which is placed on the opening area of a preform and is subsequently transferred to a molding and filling station circumferentially arranged on a working wheel. After the molding and filling of the preform, the filled container, along with the placed extension piece, is finally further transported to a different working wheel, where the container and the extension piece are separated, in order to then seal the container. This extension piece is intended to protect against sloshing and prevent the filled material from escaping.

The object of the present invention is to obtain a method and/or a device such that, to the extent possible, no filling material can reach the inner surfaces of the mold.

To achieve the object, the method according to the invention has the features of claim 1. In particular, it is provided that the mold halves are removed from the respective container before the molding and filling element and the mold base are separated from the container. The mold halves are first detached from the respective container so that splashes or drops of the filling material dripping off the container cannot reach the inner surfaces of the mold halves when the molding and filling element is later lifted off. The respective container remains clamped between the molding and filling element and the mold base. Only later are the molding and filling element and the mold base separated from the container. An essential feature of the method according to the invention is the sequence of the individual steps shown. In the prior art, on the other hand, the mold base and the mold halves are removed from the container at the same time, often even in a motion-coupled manner.

According to a further concept of the invention, it can be provided that the mold halves are removed from the respective container in a lateral direction and/or diagonally downwards. This allows the mold halves to be moved into a secure position, i.e. protected from contamination by filling material.

According to a further concept of the invention, it can be provided that the mold halves are moved downwards after a lateral and/or diagonally downward movement. A combined movement is therefore also possible, initially with a lateral component and then in a downward direction relative to the container.

According to a further concept of the invention, it can be provided that the respective container is held in the area of a container neck or support ring, while the container and molding and filling element are separated from one another. The support ring is preferably provided on the container neck. The container neck and support ring are thicker-walled and more stable than the rest of the container and can handle the forces otherwise absorbed by the molding and filling element. Before the container and the molding and filling element are separated from one another, the container is grasped in the area of the container neck, preferably on the container neck, on the support ring, or under the support ring.

According to a further concept of the invention, it can be provided that the respective container is held in the area of a container neck and on the mold base, while the container and molding and filling element are separated from one another. In this phase, the container can be clamped between the neck of the container and the mold base.

According to a further concept of the invention, it can be provided that the mold base is removed downwardly from the respective container, while the container is held in the area of the container neck. Accordingly, the mold base is preferably removed last, after the mold halves and the molding and filling element have been removed from the container.

According to a further concept of the invention, it can be provided that the respective container is held on or under a support ring, while the mold base is removed downwardly from the container. The container is preferably provided with a support ring in the area of the container neck and can be held there.

According to a further concept of the invention, it can be provided that the mold base is separated from the respective container after the molding and filling element. The time offset can be in the range of seconds. This ensures that residue of the filling material cannot reach the inner surface of the mold base, but rather drips off beforehand.

According to a further concept of the invention, it can be provided that the respective container is grasped by a removal retainer in the area of a container neck or support ring after removal of the mold halves and before the separation of the mold base. Accordingly, the container is grasped in the area mentioned and in this phase by a special retainer. The removal retainer preferably holds the container on or under the support ring. The removal retainer can grasp the container in an area that was previously covered by the mold halves.

According to a further concept of the invention, it can be provided that the respective container is held in the forming and filling station by a station-side retainer, that the station-side retainer holds the container together with the removal retainer, while the mold base and the forming and filling element are separated from the container, and that the station-side retainer is subsequently detached from the container. This sequence ensures that the container is always grasped by at least one of the retainers.

The device provided to achieve the object has the features of claim 11. Preferably, a device for producing filled containers from preforms with particularly carousel-like circulating molding and filling stations is provided, which have a molding and filling element and a mold for receiving the preforms, in which the preforms can each be transferred to the molding and filling elements and are reshaped in the mold into the respective container by the action of pressure from a supplied filling material, in which the mold with mold base and mold halves is formed in several parts, and the respective preform can be clamped between the mold base below and the molding and filling element above during the molding and filling process, and in which the container can be separated from the respective molding and filling element and the respective mold after the molding and filling. According to the invention, it can be provided that the mold halves can be removed from the respective container before the molding and filling element and the mold base are separated from the container. For this purpose, the device has a suitable control system and elements for moving the mold halves, the mold bases, and the molding and filling elements.

According to a further concept of the invention, it can be provided that the mold halves can be moved laterally and/or diagonally downwards from a molding and filling position into a removal position.

According to a further concept of the invention, it can be provided that the mold halves can be moved laterally and downwards into the removal position.

In a manner known per se, retainers on the station side can be provided at each molding and filling station for grasping the preforms and containers in the area of a container neck or support ring. Likewise, removal retainers known per se can be provided in the area of a removal station for grasping the containers in the area of the container neck or support ring. At times, the filled container should, in particular, be held at the same time by the station-side retainer and the removal retainer before the station-side retainer is released.

Figure 2:
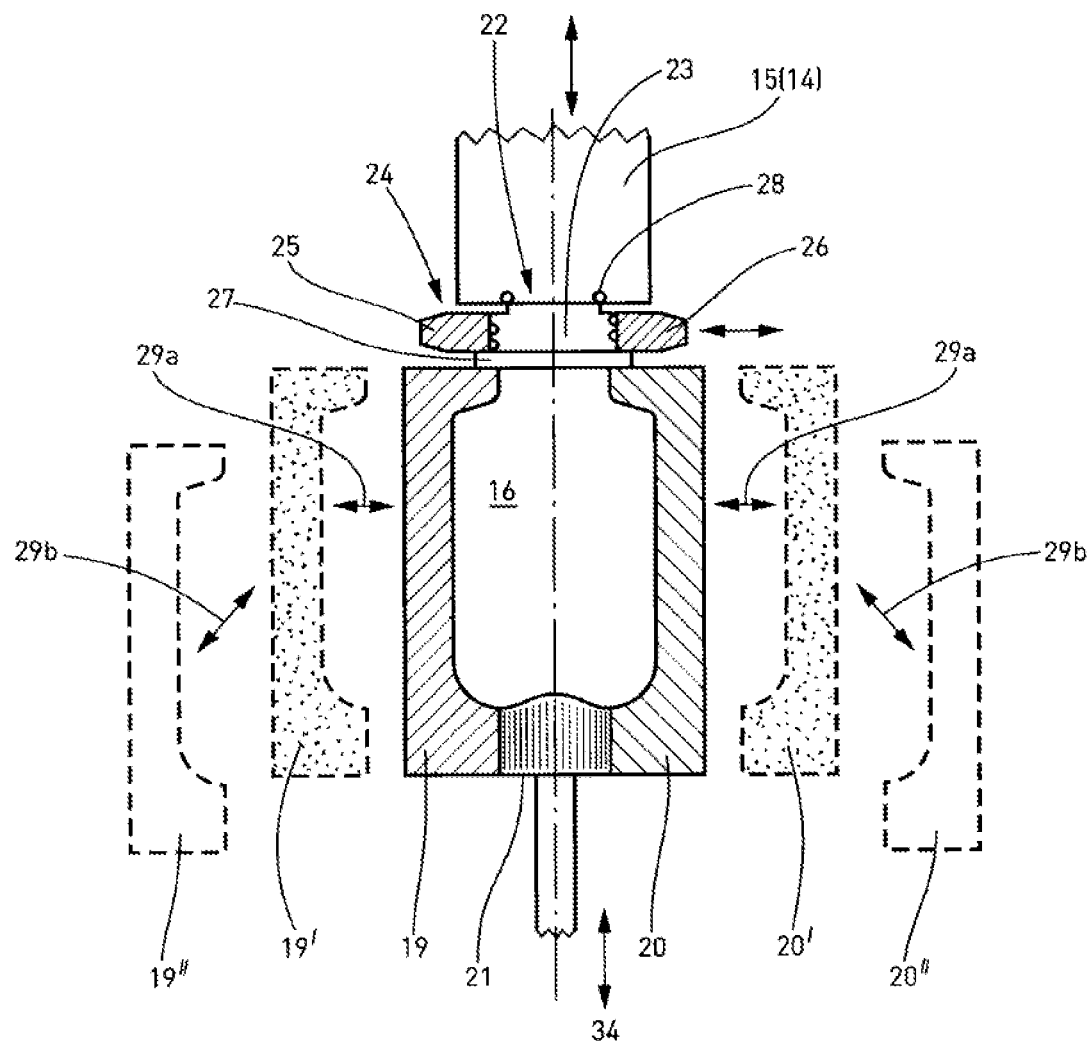
Figure 3:
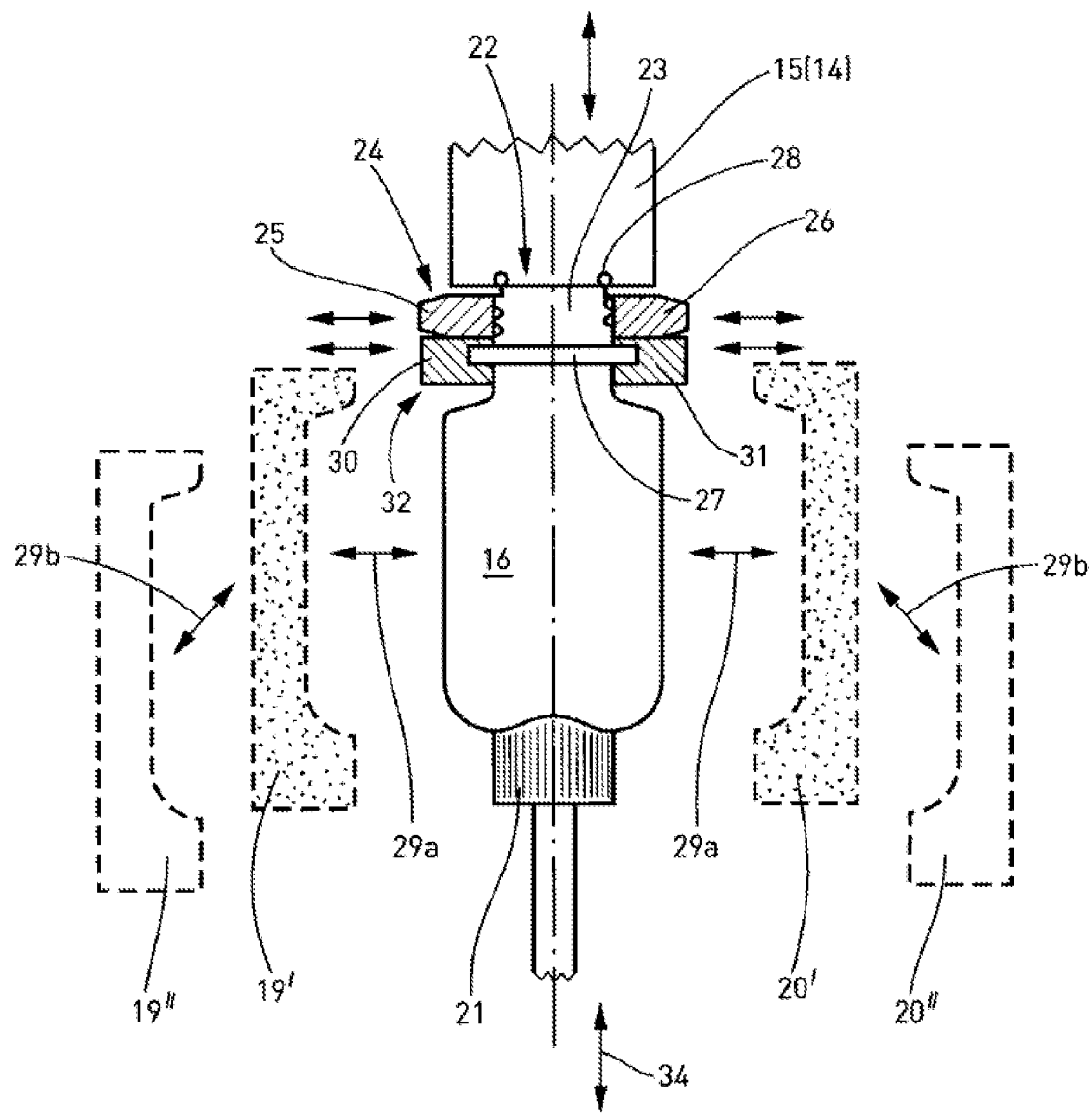

Further features of the invention can also be found in the description and in the claims. The following is shown:

FIG. 1a schematic top view of a device for producing filled containers from preforms;

FIG. 2a part of the device according to FIG. 1, in an upright section, in particular a mold with a filled container and in a first phase;

FIG. 3 the representation according to FIG. 2, in a second phase; and

Figure 4:
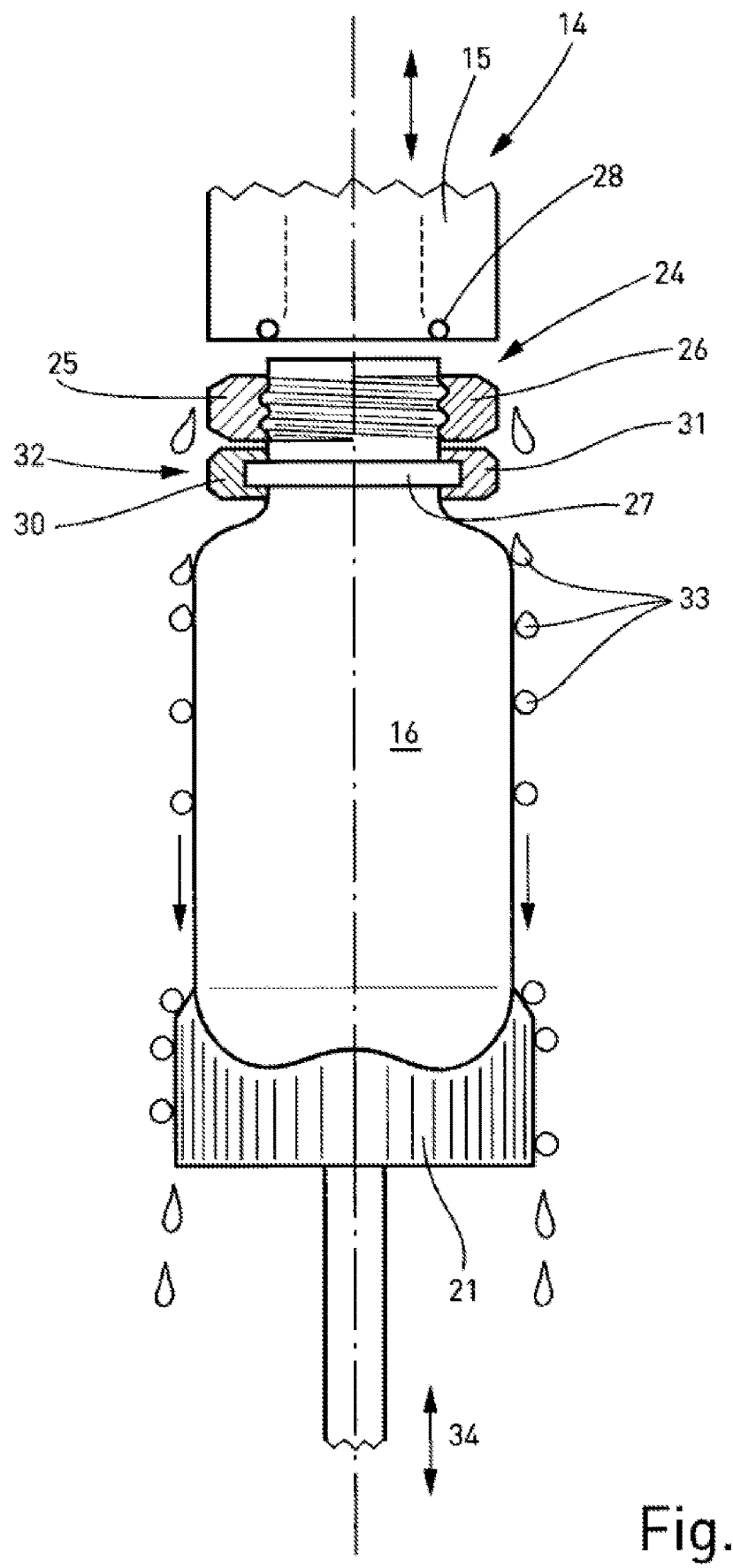

FIG. 4 the representation according to FIG. 3, in a third phase, and with a slightly modified mold.

Reference is first made to FIG. 1. As in WO 2012/156014 A1, several molding and filling stations 11.1-11.8 are arranged sequentially on the circumference of a working wheel 10 in the circumferential direction. Numbering and quantity have been chosen arbitrarily. More or fewer molding and filling stations can also be provided. The working wheel 10 and molding and filling stations 11.1-11.8 form a carousel with an upright axis of rotation, to which preforms 13 made of thermoplastic material are supplied essentially tangentially by means of a transfer conveyor 12.

Each molding and filling station 11.1-11.8 has a molding and filling element 14 which contains a nozzle 15. During the circulation on the working wheel 10, the preforms 13 are filled from the molding and filling element 14 and, at the same time, deformed into containers 16. The fully molded containers 16 are transferred to a removal conveyor 18 essentially tangentially in the area of a transfer point 17. Accordingly, there is no container 16 in the molding and filling station 11.8, which is located between the removal conveyor 18 and the transfer conveyor 12 at that point. In the top view shown, the working wheel 10 rotates clockwise from above, while the transfer conveyor 12 and removal conveyor 18 rotate counter-clockwise.

In addition to the molding and filling element 14, a mold, not shown in FIG. 1, is provided in each molding and filling station 11.1-11.8 for receiving the preforms 13 and for molding the container 16. The mold can be seen in FIGS. 2 to 4 and consists, in this case in a known manner, of two mold halves 19, 20 and a mold base 21. FIGS. 2 to 4 relate to the fully molded container 16 and to a drain located approximately between the position of the molding and filling station 11.6 and the removal conveyor 18. The filling and molding of the container 16 is completed in this area. The containers cool down there to such an extent that there is sufficient dimensional stability. In addition, the parts of the mold (mold halves 19, 20 and mold base 21), on the one hand, and the molding and filling element 14, on the other hand, as well as other illustrated device parts, are moved in a special way.

As shown in FIG. 2, the container 16 is held between the mold halves 19, 20, the mold base 21, and the nozzle 15 of the molding and filling element 14. In order to ensure leak-tightness between a container opening 22 at the upper end of a container neck 23 and the nozzle 15, the container 16 is clamped between the mold base 21 and the nozzle 15.

The container 16 is also held in the area of the container neck 23 by a station-side retainer 24 with retaining cheeks 25, 26. The retainer 24 is, accordingly, a component of each molding and filling station 11.1-11.8.

The container 16 has a support ring 27 at the lower end of the container neck 23 and is also provided with a thread on the outside, not shown in detail, for screwing on a closure cap. With regard to its external shape, the container 16 corresponds to a commercially available PET bottle for mineral water or other so-called soft drinks.

The nozzle 15 rests against the container neck 23 with a circumferential seal 28.

After the container 16 has been filled and molded, the two mold halves 19, 20 are first detached from the container 16 and moved sideways; see arrows 29a. For this purpose, retaining and moving means, not shown in the figures, are provided, for example rotationally or translationally movable and driven support arms or levers. The new position of the mold halves resulting from the sideways movement is shown in FIGS. 2 and 3 with the representation of the mold halves 19' and 20' as dotted mold halves. In this phase, the mold base 21 continues to rest against the container 16 such that the container 16 remains clamped between the molding and filling element 14 and the mold base 21, while the mold halves 19, 20 are moved sideways.

As can be seen in FIG. 2, the mold halves 19, 20 extend to directly below the support ring 27. After the described lateral movement of the mold halves 19, 20, the container is grasped in the area of the now freely accessible support ring 27 by retaining cheeks 30, 31 of a removal retainer 32 so that both the station-side retainer 24 and the removal retainer 32 are temporarily holding the container 16.

In a next step, the mold halves 19, 20 are moved downwards or diagonally downwards; see arrows 29b and the mold halves 19" and 20" indicated by dashed lines in FIGS. 2 and 3. The distance between the mold halves 19" and 20" and the container 16 preferably corresponds to one to four container diameters. The mold halves 19" and 20" are lowered, relative to the height of the container, by preferably 20-100%, in particular about 30%, as shown in FIG. 3. In this way, filling material splashes cannot land on the mold halves in the next phase.

According to FIG. 4, the molding and filling element 14 is lifted from the container opening 22 in a next phase. The container 16 is still being held by the station-side retainer 24 and by the removal retainer 32. The mold base 21 also rests against the container 16 at the bottom.

Due to the pressure inside the container 16, in particular after being filled with carbonated filling material, filling material residue 33 can then escape from the molding and filling element 14 or from the container opening 22 to the outside, for example sideways as a splash or as drops running down the container 16, as shown in FIG. 4. The mold halves 19" and 20" are so far away that their inner surfaces cannot be wetted by the splashes or drops. The drops run downwards on the outside of the container 16 and on the outside of the mold base 21. Splashes spray above the mold halves. Inner surfaces of the mold base 21 are not wetted either. Optimal hygienic conditions are maintained. Defects when producing another container after receiving a new preform are avoided.

The configuration shown in FIG. 4 is maintained for a while in order to ensure complete draining. Only then is the mold base 21 lowered and thus separated from the container 16; see arrow 34. The period of time provided for the dripping corresponds to a partial rotation of the working wheel 4 or a swept angle α; see FIG. 1. The angle α is preferably 5°-30°.

The mold base 21 is only lowered after the filling material residue 33 has drained off. Due to the rotation of the working wheel 10, some of the filling material residue is also spun off.

The containers 16 are then transferred to the removal conveyor 18. For this purpose, the station-side retainer 24 detaches its retaining cheeks 25, 26 from the container neck 23.

After the container 16 has been transferred to the removal conveyor 18, the mold halves and the mold base are moved back into a position in which the next preform 13 can be received and the mold can be closed quickly as a whole.

FIGS. 2 and 3, on the one hand, and FIG. 4, on the other hand, show different mold bases 21. These can be smaller in diameter than the container 16 or protrude slightly laterally beyond the container 16; see FIG. 4. In both cases, filling material residue 33 can drip off. In the somewhat narrower configuration of the mold base 21 according to FIGS. 2 and 3, the draining process is somewhat more reliable. When using the further mold base 21 according to FIG. 4, the mold halves are to be adapted in the lower area.

The mold halves 19, 20 are not real "halves," since at least the mold base 21 is also present. Instead of two mold halves, more parts can also be provided, which together perform the function of the mold halves shown here. Mold halves are usually understood to be the parts of a mold that define the side and shoulder contours of the container 16, up to the container neck 23 under the support ring 27 in the present example. The preforms 13 used are typically already provided with the container neck 23 and the support ring 27.

| List of reference numerals | |
| --- | --- |
| 10 | Working wheel |
| 11.1 | Molding and filling station |
| 11.2 | Molding and filling stations |
| 11.3 | Molding and filling stations |
| 11.4 | Molding and filling stations |
| 11.5 | Molding and filling stations |
| 11.6 | Molding and filling stations |
| 11.7 | Molding and filling stations |
| 11.8 | Molding and filling stations |
| 12 | Transfer conveyor |
| 13 | Preforms |
| 14 | Molding and filling element |
| 15 | Nozzle |
| 16 | Container |
| 17 | Transfer point |
| 18 | Removal conveyor |
| 19 | Mold half |
| 19' | Mold half 19 in a different position |
| 19" | Mold half 19 in a different position |
| 20 | Mold half |
| 20' | Mold half 20 in a different position |
| 20" | Mold half 20 in a different position |
| 21 | Mold base |
| 22 | Container opening |
| 23 | Container neck |
| 24 | Station-side retainer |
| 25 | Retaining cheek |
| 26 | Retaining cheek |
| 27 | Support ring |
| 28 | Seal |
| 29a | Arrows |
| 29b | Arrows |
| 30 | Retaining cheek |
| 31 | Retaining cheek |
| 32 | Removal retainer |
| 33 | Filling material residue |
| 34 | Arrow |
| α | Angular range |

The invention claimed is:

1. A method for producing a filled container from a preform, the method comprising transferring the preform to a circulating molding and filling element of a molding and filling station and, in a subsequent molding and filling process, reshaping the preform in a mold into the filled container by supplying a filling material under pressure into the preform through a nozzle of the molding and filling element, wherein the mold comprises a mold base and a plurality of mold sides, and wherein the container is clamped between the mold base from below and the nozzle of the molding and filling element from above, at least at the end of the molding and filling process, wherein the container is separated from the molding and filling element and the mold after the molding and filling process, and wherein the plurality of mold sides are removed from the container before the nozzle of the molding and filling element and the mold base are separated from the container.

2. The method according to claim 1, wherein the plurality of mold sides are removed from the container in a lateral direction and/or diagonally downwards relative to the container.

3. The method according to claim 2, wherein the plurality of mold sides are moved downwards after a lateral and/or diagonally downwards movement relative to the container.

4. The method according to claim 1, wherein the container is held in an area of a container neck or support ring, while the container and the molding and filling element are separated from each other.

5. The method according to claim 1, wherein the container is held in an area of a container neck and on the mold base, while the container and molding and filling element are separated from each another.

6. The method according to claim 5, wherein the mold base is removed downwardly from the container, while the container is held in the area of the container neck.

7. The method according to claim 4, wherein the container is held on or under a support ring, while the mold base is removed downwardly from the container.

8. The method according to claim 1, wherein the mold base is separated from the container later in time than the molding and filling element.

9. The method according to claim 8, wherein the container is grasped in an area of a container neck or support ring after removal of the plurality of mold sides and before separation of the mold base by a removal retainer.

10. The method according to claim 9, wherein the container is held in the forming and filling station by a station-side retainer such that the station-side retainer holds the container together with the removal retainer while the mold base and the forming and filling element are separated from the container, and wherein the station-side retainer is subsequently detached from the container.

11. A device for producing filled containers from preforms, the device comprising a plurality of carousel-like circulating molding and filling stations wherein at least one of the molding and filling stations has a molding and filling element and a mold for receiving a preform, wherein the device is configured to transfer the preform to the molding and filling and to reshape the preform in the mold into a container by supplying a liquid filling material under pressure into the preform in a molding and filling process, wherein the mold comprises a mold base and a plurality of mold sides, wherein the device is configured to clamp the container between the mold base from below and the molding and filling element from above, at least at the end of the molding and filling process, wherein the device is configured to separate the container from the molding and filling element and the mold after the molding and filling process, wherein the device is configured to remove the plurality of mold sides from the container before the molding and filling element and the mold base are separated from the container.

12. The device according to claim 11, wherein the device is configured to move the plurality of mold sides from a forming and filling position into a removal position laterally and/or diagonally downwards relative to the container.

13. The device according to claim 12, wherein the device is configured to move the plurality of mold sides into the removal position laterally and downwards relative to the container.

* * * * *